United States Patent Office 3,004,031
Patented Oct. 10, 1961

3,004,031
DIQUATERNARY SALTS OF PAPAVERINO ESTERS
Edwin Percival Taylor, Henry Oswald Jackson Collier, and Jan Mieczyslaw Zygmunt Gladych, all of London, England, assignors to Allen & Hanburys Limited, London, England, a British company
No Drawing. Filed July 1, 1959, Ser. No. 824,182
Claims priority, application Great Britain July 3, 1958
5 Claims. (Cl. 260—286)

This invention relates to new heterocyclic compounds.
The compounds of the present invention are diquaternary salts of bis -[ω-(tetrahydro-papaverino)alkyl] esters of aliphatic dicarboxylic acids of the general formula:

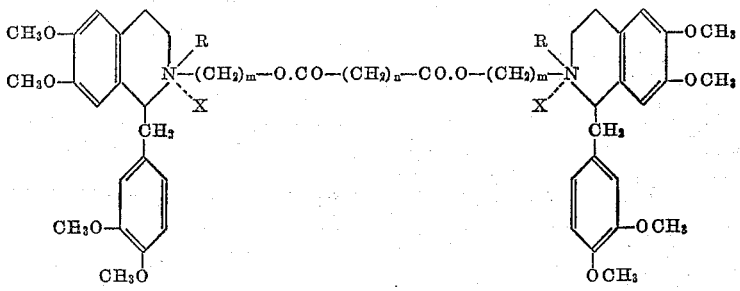

where R is a lower alkyl group containing not more than 6 carbon atoms; X is an anion; m is 2 or 3 and n is 0, 1, 2, 3 or 4.

The preferred compounds are the dibromide and diiodide of bis-[γ-(N-methyl-tetrahydro-papaverino)propyl] oxalate.

The present invention also includes a process for preparing the compounds of the present invention, which comprises refluxing an excess of an N-alkyl tetrahydro papaverine with an ω-bromalkyl dicarboxylate in an inert solvent for a prolonged period, e.g., several days. The inert solvent may, for example, be an aromatic hydrocarbon such as benzene.

The present invention further includes a process for preparing the compounds of the present invention which comprises reacting an ω-bromoalkyl dicarboxylate with tetrahydro papaverine, and treating the product obtained with at least 2 molecular proportions of an alkyl halide or sulphate.

The compounds of this invention are useful as muscle relaxants.

The following examples illustrate the invention:

EXAMPLE 1

Preparation of the dibromide of bis-[β-(N-methyl-tetrahydro-papaverino)ethyl]malonate 1.7 gm. of laudanosine, 0.5 g. of β-bromoethyl malonate and 20 ml. of dry benzene were refluxed together for 300 hours. The product which separated hardened on cooling and was removed by filtration, washed with benzene and dried. The solid residue was purified by dissolving in anhydrous ethanol and adding the solution thus formed drop by drop to mechanically stirred ether. The precipitate was filtered off and reprecipitated in a similar manner. The product was a cream-coloured microcrystalline powder.
$C_{49}H_{64}O_{12}N_2Br_2$ requires: N, 2.7%; Br, 15.5%.
Found: N, 2.7%; Br, 15.3%.

EXAMPLE 2

Preparation of the dibromide of bis-[β-(N-methyl-tetrahydro-papaverino)ethyl]succinate 3.2 gm. of laudanosine, 1.0 g. of β-bromoethyl succinate and 25 ml. of dry benzene were refluxed together for 134 hours. The products of the reaction was a thick gum from which the benzene was removed by decantation. The residue was washed three times with hot benzene by decantation, dried and dissolved in methanol. The solution thus obtained was added drop by drop to mechanically stirred ether. The precipitate was filtered off and was further purified by twice reprecipitating in a similar manner. The product was a cream-coloured microcrystalline powder.
$C_{50}H_{66}O_{12}N_2Br_2$ requires: N, 2.7%; Br, 15.3%.
Found: N, 2.7%; Br, 15.8%.

EXAMPLE 3

Preparation of the dibromide of bis-[β-(N-methyl-tetrahydro-papaverino)ethyl]oxalate 1.8 gm. of laudanosine, 0.5 g. of β-bromoethyl oxalate and 30 ml. of dry benzene were refluxed together for 416 hours. The product which separated hardened on cooling, the benzene was removed by decantation and the residue was washed three times with hot benzene and dried. The solid residue was purified by dissolving it in anhydrous ethanol and adding the solution thus formed drop by drop to mechanically stirred ether. The precipitate was filtered off and twice reprecipitated in a similar manner. The product was a cream-coloured powder.
$C_{48}H_{62}O_{12}N_2Br_2$ requires: N, 2.75%; Br, 15.7%.
Found: N, 3.0%; Br, 16.0%.

EXAMPLE 4

Preparation of the dibromide of bis-[β-(N-methyl-tetrahydro-papaverino)ethyl]glutarate 3.1 gm. of laudanosine, 1.0 g. of β-bromoethyl glutarate and 40 ml. of dry benzene were refluxed together for 425 hours. After removal of the benzene by decantation the gummy residue was washed three times with hot benzene and dried. The residue was purified by dissolving in anhydrous ethanol and adding the solution thus formed drop by drop to mechanically stirred ether. The precipitate was filtered off and reprecipitated twice in a similar manner. The product was a cream-coloured powder.
$C_{51}H_{68}O_{12}N_2Br_2$ requires: N, 2.6%; Br, 15.1%.
Found: N, 2.65%; Br, 14.5%.

EXAMPLE 5

Preparation of the dibromide of bis-[β-(N-methyl-tetrahydro-papaverino)ethyl]adipate 1.4 gm. of laudanosine, 0.5 g. of β-bromoethyl adipate and 20 ml. of dry benzene were refluxed together for 950 hours. The product was a thick gum from which the benzene was removed by decantation and the residue washed three times with hot benzene and dried. The residue was purified by dissolving in anhydrous ethanol and adding the solution thus formed drop by drop to mechanically stirred ether. The precipitate was filtered off and reprecipitated twice in a similar manner. The product was a cream-coloured powder.
$C_{52}H_{70}O_{12}N_2Br_2$ requires: N, 2.6%; Br, 14.9%.
Found: N, 2.85%; Br, 14.6%.

EXAMPLE 6

*Preparation of the dibromide of bis-[β-(N-ethyl-tetrahydro-papaverino)ethyl]adipate*

2.9 gm. of N-ethyl-tetrahydropapaverine, 1.0 g. of β-bromoethyl adipate and 40 ml. of dry benzene were refluxed together for 1400 hours. After removal of the benzene by decantation the gummy residue was washed three times with hot benzene and dried. The residue was purified by dissolving in anhydrous ethanol and adding the solution thus formed drop by drop to mechanically stirred ether. The precipitate was filtered off and reprecipitated twice in a similar manner. The product was a cream-coloured powder.

$C_{54}H_{74}O_{12}N_2Br_2$ requires: N, 2.5%; Br, 14.45%. Found: N, 2.7%; Br, 15.0%.

EXAMPLE 7

*Preparation of the dibromide of bis-[β-(N-ethyl-tetrahydro-papaverino)ethyl]malonate*

1.8 gm. of N-ethyl-tetrahydro-papaverine, 0.5 g. of β-bromo-ethyl malonate and 20 ml. of dry benzene were refluxed together for 1500 hours. The benzene was removed by decantation from the thick gummy residue which was then washed three times with hot benzene and dried. The residue was purified by dissolving in anhydrous ethanol and adding the solution thus formed drop by drop to mechanically stirred ether. The precipitate was filtered off and twice reprecipitated in a similar manner. The product was a creamed-coloured powder.

$C_{51}H_{68}O_{12}N_2Br_2$ requires: N, 2.6%; Br, 15.1%. Found: N, 2.7%; Br, 15.8%.

EXAMPLE 8

*Preparation of the dibromide of bis-[γ-(N-methyl-tetrahydro-papaverino)propyl]oxalate*

5.4 gm. of laudanosine, 1.25 g. of γ-bromopropyl oxalate and 35 ml. of dry benzene were refluxed together for 310 hours. After removal of the benzene by decantation the gummy residue was washed three times with hot benzene and dried. The residue was purified by dissolving in anhydrous ethanol and adding the solution thus formed drop by drop to mechanically stirred ether. The precipitate was filtered off and reprecipitated twice in a similar manner. The product was a cream-coloured powder.

$C_{50}H_{66}O_{12}N_2Br_2$ requires: N, 2.7%; Br, 15.3%. Found: N, 2.7%; Br, 14.75%.

EXAMPLE 9

*Preparation of the dibromide of bis-[γ-(N-methyl-tetrahydro-papaverino)propyl]malonate*

1.8 gm. of laudanosine, 0.58 g. of γ-bromopropyl malonate and 30 ml. of dry benzene were refluxed together for 520 hours. After removal of the benzene by decantation the gummy residue was washed three times with hot benzene and dried. The solid was purified by dissolving in anhydrous ethanol and adding the solution thus formed drop by drop to mechanically stirred ether. The precipitate was filtered off and reprecipitated twice in a similar manner. The product was a cream-coloured powder.

$C_{51}H_{68}O_{12}N_2Br_2$ requires: N, 2.6%; Br, 15.1%. Found: N, 2.6%; Br, 15.0%.

EXAMPLE 10

*Preparation of the diperchlorate of bis-[β-(N-methyl-tetrahydro-papaverino)ethyl]malonate*

0.18 gm. of the dibromide of bis-[β-(N-methyltetrahydro papaverino)ethyl]malonate, dissolved in 10 ml. of water was filtered and added dropwise to a solution of 0.1 g. of sodium perchlorate in 5 ml. of water. The precipitate was removed by filtration, washed with water, dried and recrystallised from dimethyl formamide and ether. The product was a buff-coloured compound.

$C_{49}H_{64}O_{20}N_2Cl_2$ requires: N, 2.6%; Cl, 6.6%. Found: N, 2.6%; Cl, 6.55%.

EXAMPLE 11

*Preparation of the dinitrate of bis-[β-(N-methyl-tetrahydro-papaverino)ethyl]oxalate*

0.07 gm. of the dibromide of bis-[β-(N-methyltetrahydro-papaverino)ethyl]oxalate, dissolved in 2 ml. of anhydrous ethanol was added dropwise to a solution of 0.012 g. of silver nitrate in 16 ml. of anhydrous ethanol. The reaction mixture was refluxed for 30 minutes, allowed to cool and filtered. An excess of anhydrous ether was added to the filtrate and the precipitate removed by filtration. The product was purified by redissolving in anhydrous ethanol and adding the solution thus formed drop by drop to mechanically stirred ether. The precipitate was filtered off and reprecipitated once in a similar manner. The product was a buff-coloured powder.

$C_{48}H_{62}O_{18}N_4$ requires: N, 5.76%. Found: N, 5.75%.

EXAMPLE 12

*Preparation of the diperchlorate of bis-[γ-(N-methyl-tetrahydro-papaverino)propyl]oxalate*

1.0 gm. of the dibromide of bis-[γ-(N-methyltetrahydro-papaverino)propyl]oxalate, dissolved in 15 ml. of water was added dropwise to a solution of 0.24 gm. of sodium perchlorate in 15 ml. of water. The precipitate was removed by filtration, washed with water, dried, dissolved in anhydrous acetone, and reprecipitated with anhydrous ethanol. After a further purification in a similar manner the product was a yellow powder.

$C_{50}H_{66}O_{20}N_2Cl_2$ requires: N, 2.6%; Cl, 6.5%. Found: N, 2.6%; Cl, 6.1%.

EXAMPLE 13

*Preparation of the di-iodide of bis-[γ-(N-methyl-tetrahydro-papaverino)propyl]oxalate*

4.7 gm. of tetrahydro-papaverine hydriodide was added to an excess of 2 N sodium hydroxide solution, and the liberated base completely extracted with benzene. The combined benzene extracts were washed with water and dried over anhydrous magnesium sulphate. The extract was separated by filtration and the solvent removed by distillation. The remaining light brown oil was dissolved in 50 ml. of anhydrous acetone. 1.52 gm. of anhydrous potassium carbonate and 1.66 gm. of bis(γ-bromopropyl)-oxalate, dissolved in 50 ml. of anhydrous acetone, were added to the acetone solution of tetrahydro-papaverine and refluxed together for 104 hours. The solution was cooled and separated by filtration. The solvent was removed by distillation under reduced pressure. Bis-[γ-(tetrahydro-papaverino)propyl]oxalate was obtained as a light brown oil (4.5 gm.).

1 ml. of methyl iodide was added to a solution of 2.25 gm. of bis[γ-(N-tetrahydro-papaverino)propyl]oxalate in 10 ml. of anhydrous acetone. The solution was allowed to stand for 1.5 hours and then refluxed for 1.5 hours. The oil which separated crystallised after the addition of anhydrous ether. The product was a pale yellow powder.

$C_{50}H_{66}O_{12}N_2I_2$ requires: N, 2.45%; I, 22.2%. Found: N, 2.5%; I, 22.7%.

The dibromide of bis-[γ-(N-methyl-tetrahydro-papaverino)propyl]oxalate when administered intravenously to mice in effective doses produced paralysis which was not preceded nor followed by excitation. The paralysing activity of the drug was determined in mice and the results of these experiments are summarised in Table I:

TABLE I

| Index | No. of expts. | Mean value mg./kg. | Range mg./kg. |
|---|---|---|---|
| ED 50 | 10 | 1.61 | 1.38–1.95 |
| ED 50 | 6 | 5.31 | 4.76–6.46 |

The compounds of the present invention were examined by intravenous administration to cats, maintained by artificial ventilation and prepared for recording the isometric twitch of the tibialis anterior muscle in response to stimulation of its motor nerve. The duration of activity of the neuro muscular blocking action was compared wtih that of suxamethonium chloride. The results of these experiments are given in Table II:

TABLE II

| Compound in which R, m, n and X of the general formula have the values— | | | | No. of cats | Duration of action as compared with suxamethonium (=1) |
|---|---|---|---|---|---|
| R | m | n | X | | |
| $CH_3$ | 2 | 2 | Br | 3 | 5.4 |
| $CH_3$ | 2 | 1 | Br | 8 | 2.6 |
| $CH_3$ | 3 | 1 | Br | 3 | 9.0 |
| $CH_3$ | 3 | 0 | Br | 8 | 0.5 |

In each case Neostigmine was found to be an effective antagonist. The cumulative action of suxamethonium chloride and the dibromide of bis- γ-(N-methyl-tetrahydropapaverino)propyl]oxalate were compared in three cats in which series of successive equal doses of one substance were given at equal intervals of time. The results of this experiment are given in Table III:

TABLE III

| Effect | Suxamethonium, 50 μg./kg. | | | | dibromide of bis-[γ-(N-methyl-tetrahydropapaverino)propyl]oxalate, 3 mg./kg. | | | |
|---|---|---|---|---|---|---|---|---|
| | 1st dose | 2nd dose | 3rd dose | 4th dose | 1st dose | 2nd dose | 3rd dose | 4th dose |
| Depression tibialis twitch (percent) | 69 | 83 | 88 | 94 | 69 | 65 | 74 | 75 |
| Duration to 75% recovery (sec.) | 190 | 290 | 370 | 340 | 130 | 120 | 150 | 140 |

From these results it will be seen that the compounds of the present invention have no significant cumulative effect.

What we claim is:

1. Salts of the formula:

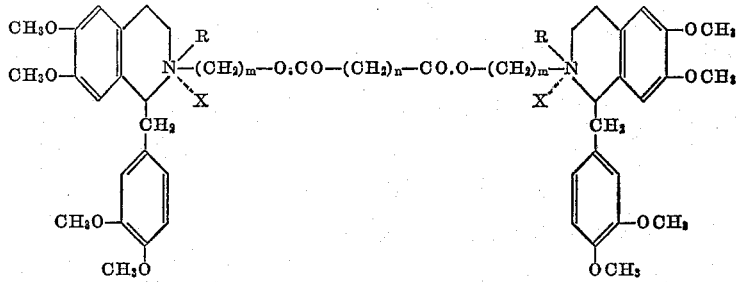

where R is a lower alkyl group of less than 7 carbon atoms, X is a non-toxic inorganic ion, m is one of the integers 2 and 3 and n is selected from the group consisting of zero, 1, 2, 3 and 4.

2. The dibromide of bis-[γ-(N-methyl-tetrahydropapaverino)propyl]oxalate.

3. The di-iodide of bis-[γ-(N-methyl-tetrahydro-papaverino)propyl]oxalate.

4. A process for preparing salts of the formula:

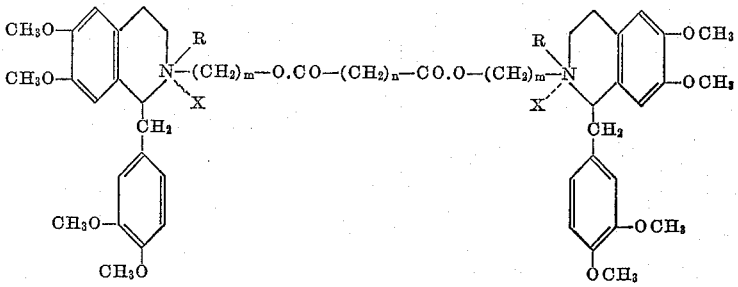

where R is a lower alkyl group of less than 7 carbon atoms, X is a non-toxic inorganic ion, m is one of the integers 2 and 3 and n is selected from the group consisting of zero, 1, 2, 3 and 4, which comprises refluxing an N-alkyl tetrahydropapaverine with an w-bromalkyl dicarboxylate in an inert organic solvent for a period of not less than 100 hours and isolating and purifying the resulting reaction product.

5. A process for preparing salts of the formula:

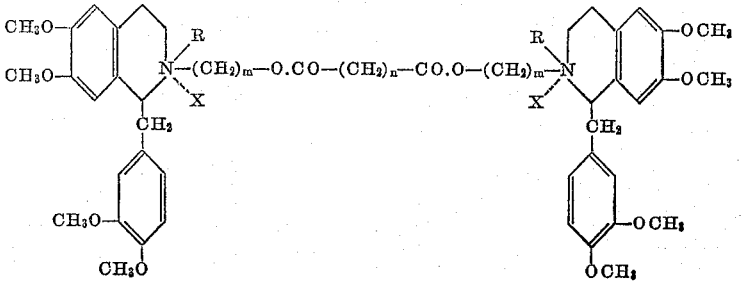

where R is a lower alkyl group of less than 7 carbon atoms, X is a non-toxic inorganic ion, $m$ is one of the integers 2 and 3 and $n$ is selected from the group consisting of zero, 1, 2, 3 and 4, which comprises reacting an w-bromalkyl dicarboxylate with tetrahydropapaverine in an inert, anhydrous organic solvent under reflux for at least about 100 hours, isolating the resulting reaction product, dissolving it in the same solvent, adding to the solution a lower alkyl compound selected from the group consisting of lower alkyl halides and lower alkyl sulfates and isolating the product thus formed.

No references cited.